United States Patent
Chen et al.

(10) Patent No.: US 8,931,858 B2
(45) Date of Patent: Jan. 13, 2015

(54) ELECTRONIC DEVICE

(71) Applicants: Hong Fu Jin Precision Industry (WuHan) Co., Ltd., Wuhan (CN); Hon Hai Precision Industry Co., Ltd., New Taipei (TW)

(72) Inventors: Yun-Lung Chen, New Taipei (TW); Chung Chai, New Taipei (TW); Sheng-He Li, Wuhan (CN); Wei-Yong Ma, Wuhan (CN)

(73) Assignee: ScienBiziP Consulting(Shenzhen)Co., Ltd., Guangdong (CN)

( * ) Notice: Subject to any disclaimer, the term of this patent is extended or adjusted under 35 U.S.C. 154(b) by 0 days.

(21) Appl. No.: 13/905,373

(22) Filed: May 30, 2013

(65) Prior Publication Data
US 2014/0062272 A1 Mar. 6, 2014

(30) Foreign Application Priority Data
Aug. 31, 2012 (CN) .......................... 2012 1 03179870

(51) Int. Cl.
*A47G 29/00* (2006.01)
*H05K 5/02* (2006.01)

(52) U.S. Cl.
CPC .................................. *H05K 5/0217* (2013.01)
USPC ......... 312/265.6; 312/117; 312/263; 220/529

(58) Field of Classification Search
CPC ........ B65D 25/04; B65D 25/06; B65F 1/004; B65F 1/0046
USPC ........ 312/114, 117, 257.1, 263, 265.5, 265.6; 220/532, 533, 529
See application file for complete search history.

(56) References Cited

U.S. PATENT DOCUMENTS

| | | | | | |
|---|---|---|---|---|---|
| 2,788,912 | A * | 4/1957 | Simonsen | ...................... | 220/533 |
| 4,577,773 | A * | 3/1986 | Bitel | .............................. | 220/533 |
| 5,167,433 | A * | 12/1992 | Ryan | ............................ | 296/37.1 |
| 5,584,412 | A * | 12/1996 | Wang | ............................. | 220/500 |
| 5,615,797 | A * | 4/1997 | Ripamonti | .................... | 220/529 |
| 5,664,856 | A * | 9/1997 | Pacetti | ........................ | 312/348.3 |
| 7,464,829 | B1 * | 12/2008 | Koefelda et al. | .............. | 220/532 |
| 8,418,874 | B2 * | 4/2013 | Ahlgrim et al. | ............... | 220/543 |
| 2008/0128428 | A1 * | 6/2008 | Beckerman | ................... | 220/532 |

* cited by examiner

*Primary Examiner* — Daniel Rohrhoff
(74) *Attorney, Agent, or Firm* — Novak Druce Connolly Bove + Quigg LLP

(57) ABSTRACT

An electronic device includes a box and a separating plate. The box includes a bottom plate and a first side plate. The bottom plate defines a clip slot, and the first side plate defines a clasping hole. The separating plate includes a main body, a clipping portion, and a hook. The clipping portion is deformable and engaged in the clasping hole for preventing the separating plate from moving in a first direction substantially perpendicular to the first side plate. The hook is slidably received in the clip slot for preventing the separating plate from moving in a second direction opposite to the first direction.

8 Claims, 4 Drawing Sheets

ELECTRONIC DEVICE

BACKGROUND

1. Technical Field

The present disclosure relates to electronic devices, more particularly to a vending machine.

2. Description of Related Art

Vending machines allow customers to buy a lot of merchandise, such as water, potato chips, for example twenty-four hours a day. When the customer retrieves the merchandise from the vending machine, the merchandise is pushed from a passage and directly drops into a cabinet. The passage is defined by a plurality of separating plates attached to a box. The plurality of separating plates is secured to the box by screws, that is time-consuming and laborious. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
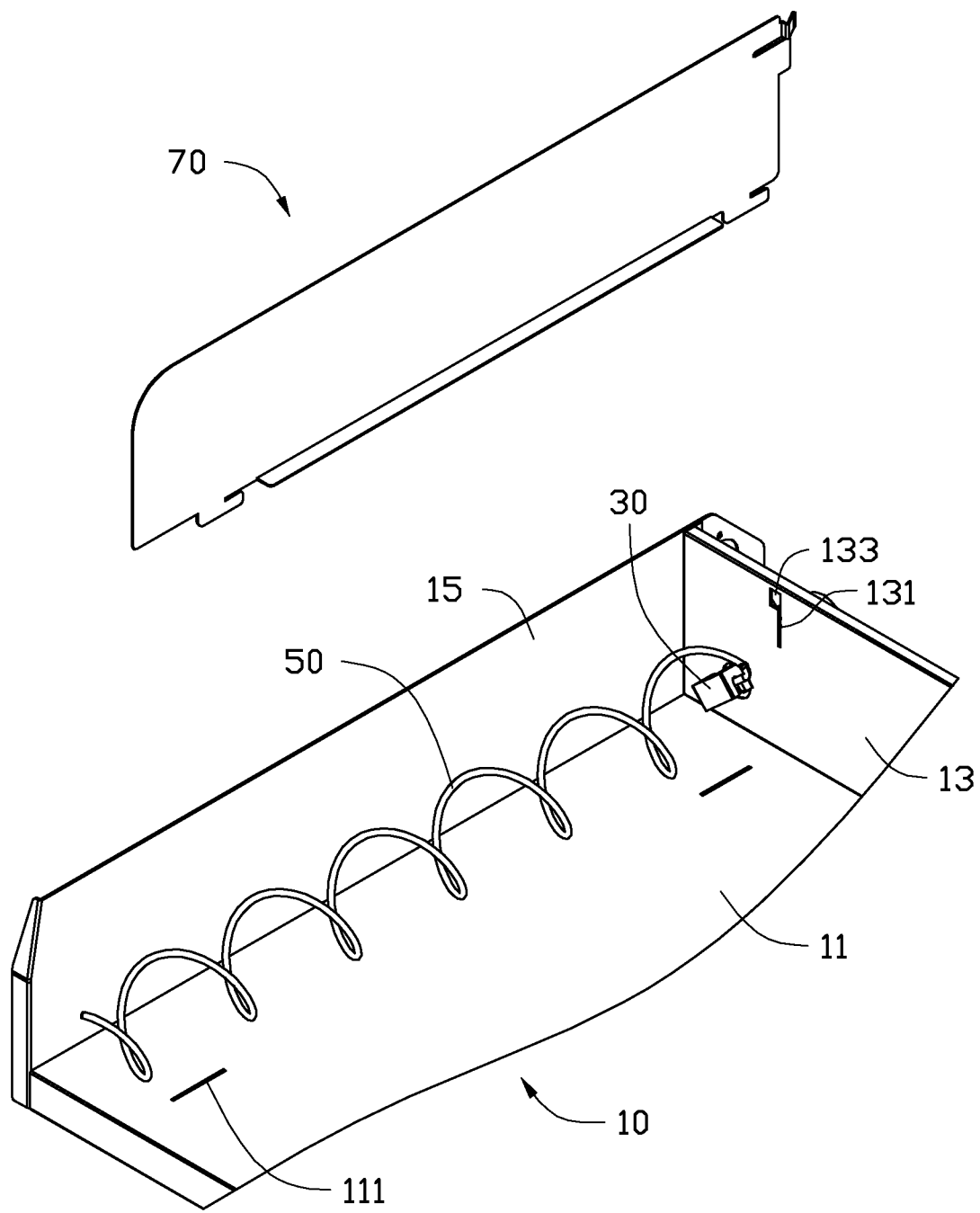
FIG. 1 is an exploded, cutaway view of an electronic device in accordance with an embodiment.
Figure 2:
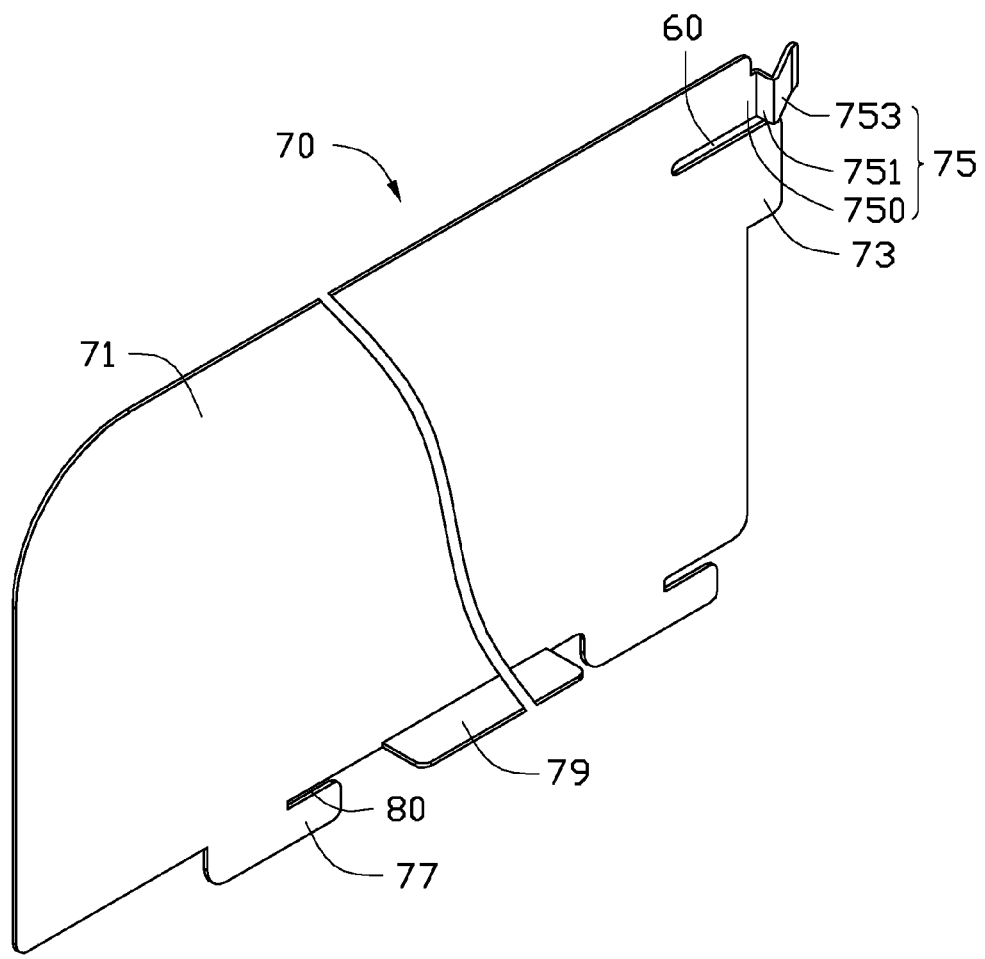
FIG. 2 is an isometric view of a separating plate of FIG. 1.
Figure 3:
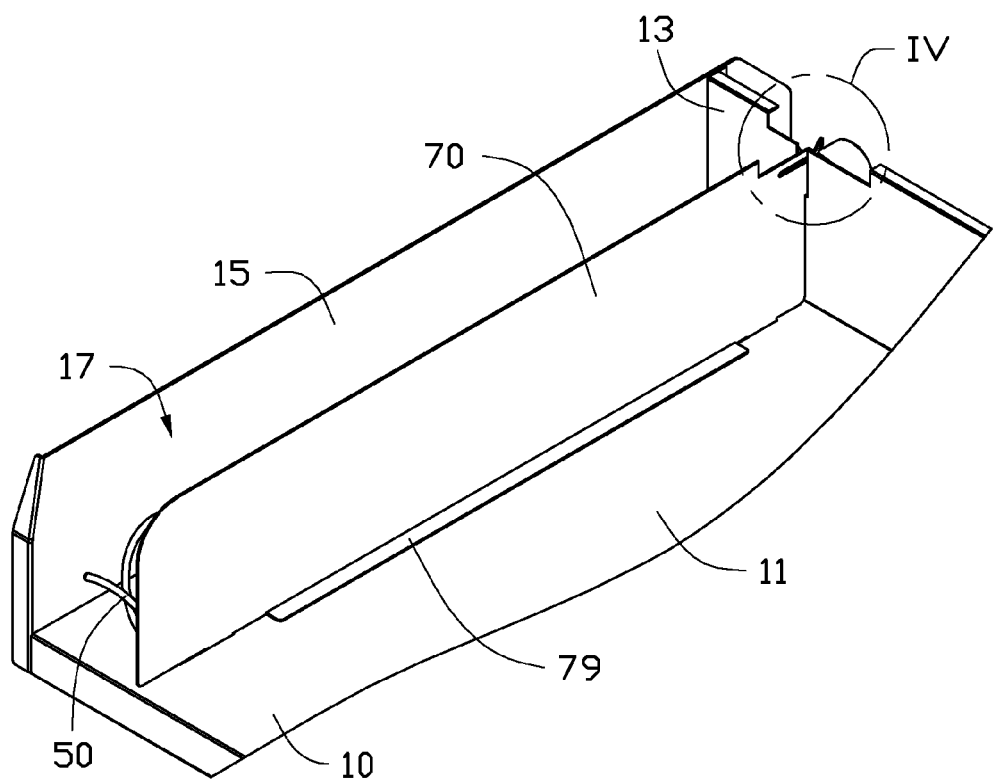
FIG. 3 is an assembled view of the electronic device of FIG. 1.

FIGS. 1-3 illustrate an electronic device in accordance with an embodiment. The electronic device comprises a box 10, a securing member 30, a pushing member 50, and a separating plate 70. In one embodiment, the electronic device is a buffering device that can be secured to a delivery tray.

The box 10 comprises a bottom plate 11, a first side plate 13 perpendicularly extending from a first edge of the bottom plate 11, and a second side plate 15 perpendicularly extending from a second edge of the bottom plate 11. In one embodiment, the first side plate 13 is substantially perpendicular to the second side plate 15. Two clip slots 111 are defined in the bottom plate 11. An extending direction of each of the two clip slots 111 is substantially parallel to the first side plate 13. The first side plate 13 defines a positioning slot 131 and a clasping hole 133 communicating with the positioning slot 131. A width of the positioning slot 131 is less than a width of the clasping hole 133.

The securing member 30 is attached to an inner surface of the first side plate 13. The securing member 30 is secured to a motor (not shown), and can be rotated relative to the first side plate 13.

The pushing member 50 is secured to the securing member 30 and placed on the bottom plate 11. The pushing member 50 is rotated to push merchandise out of the box 10. In one embodiment, the pushing member 50 is coil shaped.

FIG. 2 shows that the separating plate 70 comprises a main body 71, a positioning portion 73, a clipping portion 75, two hooks 77, and a supporting portion 79 located between the two hooks 77. The positioning portion 73 and the clipping portion 75 extend from a side edge of the main body 71, and the two hooks 77 and the supporting portion 79 extend from a bottom edge of the main body 71. The clipping portion 75 comprises a resilient piece 750, a clipping piece 751 substantially perpendicularly connected to the resilient piece 750, and an operating portion 753 slanted relative to the clipping piece 751. In one embodiment an acute angle is defined between the clipping piece 751 and the operating portion 753, the resilient piece 750 and the positioning portion 73 are located on a same plane, and a first gap 60 is defined between the resilient piece 750 and the positioning portion 73. Each of the two hooks 77 is substantially L-shaped, and a second gap 80 is defined between each hook 77 and the main body 71. In one embodiment, the main body 71, the positioning portion 73, and the two hooks 77 are located on a same plane, and the supporting portion 79 is substantially perpendicular to the main body 71.

Figure 4:
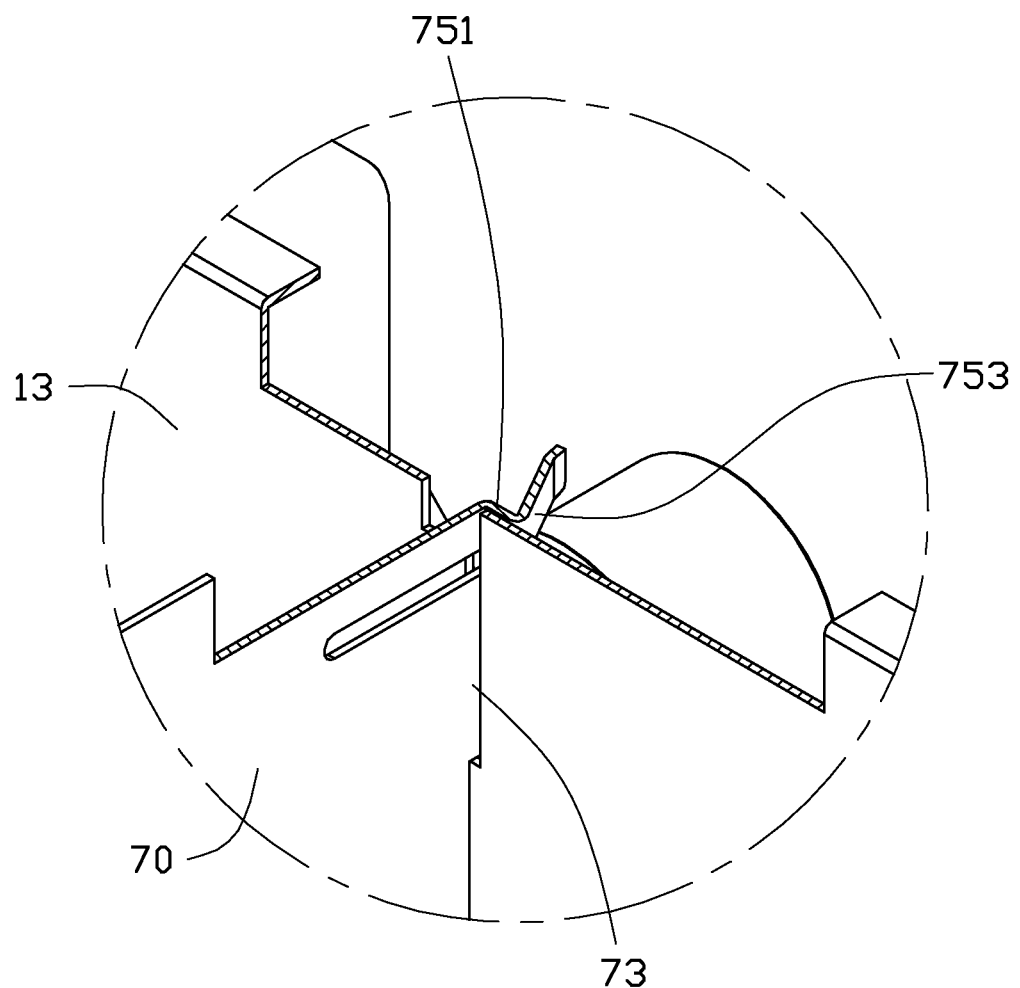
FIG. 4 is an enlarged view of a circled portion IV of FIG. 3.

FIGS. 3-4 show that in assembly, the two hooks 77 are aligned with the clip slots 111. The separating plate 70 is moved downward to engage the two hooks 77 into the two clip slots 111. At this time, the positioning portion 73 is aligned with the positioning slot 131, and the clipping portion 75 is aligned with the clasping hole 133. The separating plate 70 is moved in a direction substantially parallel to the bottom plate 11 and towards the first side plate 13, until the operating portion 753 abuts the edges of the clasping hole 133.

The separating plate 70 is further moved towards the first side plate 13, the resilient piece 750 is deformed towards to the second side plate 15, and the positioning portion 73 is inserted into the positioning slot 131. When the clipping portion 75 extends through the clasping hole 133, the resilient piece 750 is released back to clip the clipping piece 751 with the first side plate 13, to prevent the separating plate 70 from moving in a first direction substantially perpendicular to the first side plate 13.

The two hooks 77 are engaged in the two clip slots 111, and the bottom plate 11 is received in the two second gaps 80, to prevent the separating plate 70 from moving in a second direction and a third direction. The second direction is opposite to the first direction, and the third direction is upwards and substantially perpendicular to the bottom plate 11. Therefore, the separating plate 70 is secured to the box 10. The supporting portion 79 is attached to an inner surface of the bottom plate 11 to prevent the separating plate 70 from moving in a fourth direction opposite to the third direction. A passage 17 is defined between the second side plate 15 and the separating plate 70, and the pushing member 50 is located in the passage 17.

In disassembly, the operating portion 753 is pressed towards the second side plate 15, and the resilient piece 750 is deformed to detach the clipping piece 751 from the clasping hole 133. The separating plate 70 is moved away from the first side plate 13 to disengage the positioning portion 73 from the positioning slot 131. The two hooks 77 are removed from the two clipping slots 111, and the separating plate 70 is moved upward and can be disengaged from the box 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device comprising:
   a box comprising a bottom plate and a first side plate extending from the bottom plate; and a clasping hole defined in the first side plate; and
   a separating plate comprising a main body, substantially perpendicular to the bottom plate, and a clipping portion, extending from the main body; the clipping portion comprising a resilient piece, a clipping piece, and an operating portion; the clipping piece located between the resilient piece and the operating portion, and the operating portion slanted relative to the first side plate; a positioning portion extending from the main body; the positioning portion and the resilient piece being located on a same plane that is substantially perpendicular to the first side plate, a first gap defined between the resilient piece and the positioning portion for allowing the resilient piece to be deformable;
   wherein the clipping piece is hooked in the clasping hole for preventing the separating plate from moving in a first direction substantially perpendicular to the first side plate; and
   the separating plate further comprises a positioning portion extending from the main body, a positioning slot is defined in the first side plate and engaged in the positioning slot; and the positioning slot communicates with the clasping hole, and a width of the positioning slot is less than a width of the clasping hole.

2. An electronic device comprising:
   a box comprising a bottom plate and a first side plate extending from the bottom plate; a clip slot defined in the bottom plate, and a clasping hole and a positioning slot defined in the first side plate; the positioning slot communicating with the clasping hole, and a width of the positioning slot is less than a width of the clasping hole; and
   a separating plate comprising a main body, a clipping portion, and a hook; the clipping portion extending from a first edge of the main body, and the hook extending from a second edge of the main body; the second edge substantially perpendicular to the first edge; a positioning portion extending from the main body and engaged in the positioning slot;
   wherein the clipping portion is deformable and clipped in the clasping hole for preventing the separating plate from moving in a first direction substantially perpendicular to the first side plate, and the hook is slidably received in the clip slot for preventing the separating plate from moving in a second direction opposite to the first direction.

3. The electronic device of claim 2, wherein the clipping portion comprising a resilient piece, a clipping piece and an operating portion slanted relative to the first side plate; the resilient potion and the positioning portion are located on a same plane, and a first gap is defined between the resilient potion and the positioning portion.

4. The electronic device of claim 2, wherein an extending direction of the clip slot is substantially perpendicular to the first side plate.

5. The electronic device of claim 2, wherein the hook and the main body are located on a same plane.

6. The electronic device of claim 2, wherein the hook is substantially L-shaped, a second gap is defined between the hook and the main body, and the bottom plate is engaged in the second gap.

7. The electronic device of claim 2, wherein the separating portion further comprises a supporting portion, the supporting portion abuts the bottom plate for preventing the separating plate from moving in a third direction substantially perpendicular to the bottom plate, and the hook is engaged in the clip slot for preventing the separating plate from moving in a fourth direction opposite to the third direction.

8. The electronic device of claim 7, wherein the supporting portion is substantially perpendicular to the main body and parallel to the bottom plate.

* * * * *